United States Patent Office 2,870,178
Patented Jan. 20, 1959

2,870,178

CHEMICAL COMPOUNDS AND PROCESSES OF PREPARING SAME

Edward W. Tristram, Cranford, N. J., assignor to Merck & Co., Inc., Rahway, N. J., a corporation of New Jersey No Drawing. Original application August 5, 1955, Serial No. 526,774, now Patent No. 2,837,542, dated June 3, 1958. Divided and this application October 22, 1956, Serial No. 617,209

1 Claim. (Cl. 260—397.45)

This application is a division of my copending application Serial No. 526,774, filed August 5, 1955.

This invention relates to the preparation of 1,4-pregnadiene-17α,21-diol-3,11,20-trione. It is also concerned with the preparation of the novel chemical compounds 1,2 - dibromopregnane - 17α,21 - diol - 3,11,20 - trione-21-acetate; and 2-bromo-1-pregnene-17α,21-diol-3,11,20-trione-21-acetate produced as intermediates in the synthesis of 1,4-pregnadiene-17α,21-diol-3,11,20-trione.

The 1,4-pregnadiene-17α,21-diol-3,11,20-trione with which this invention is concerned possesses marked and effective properties in the treatment of arthritic conditions. One of the chief disadvantages encountered in the clinical use of hydrocortisone and cortisone has been the retention of sodium and water in the body. In contrast with this the retention of sodium and water in the body is markedly reduced when 1,4-pregnadiene-17α,21-diol-3,11,20-trione is administered.

In preparing 1,4-pregnadiene-17α,21-diol-3,11,20-trione in accordance with the present invention, the starting material 1-pregnene-17α,21-diol-3,11,20-trione-21-acetate which has the structure—

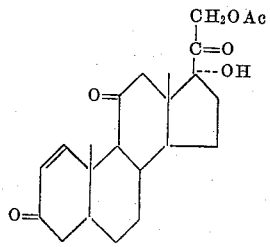

is reacted with bromine and an organic base in the presence of lithium chloride to form 1,4-pregnadiene-17α,21-diol-3,11,20-trione-21-acetate having the structure—

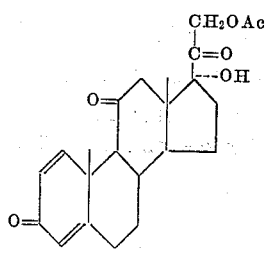

In accordance with this process 1-pregnene-17α,21-diol-3,11,20-trione-21-acetate is directly converted to 1,4-pregnadiene-17α,21-diol-3,11,20-trione-21-acetate.

Alternatively the starting material 1-pregnene-17α,21-diol-3,11,20-trione-21-acetate can be reacted with one molar equivalent of bromine to form 1,2-dibromopregnane-17α,21-diol-3,11,20-trione-21-acetate which has the structure—

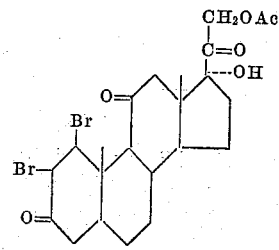

This latter compound is reacted with an organic base in the presence of lithium chloride to form 2-bromo-1-pregnene-17α,21-diol-3,11,20-trione-21-acetate having the following structural formula—

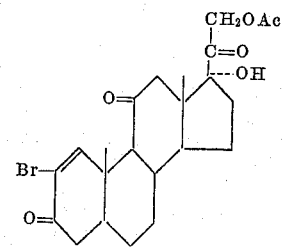

This latter compound can be reacted with additional organic base in the presence of lithium chloride to form 1,4 - pregnadiene - 17α,21 - diol - 3,11,20 - trione - 21-acetate. The organic bases which may be employed in this process include dimethylformamide, collidine and dimethylaniline. The latter compound is hydrolyzed to form 1,4-pregnadiene-17α,21-diol-3,11,20-trione.

In accordance with one method of directly converting the starting material 1-pregnene-17α,21-diol-3,11,20-trione-21-acetate to 1,4-pregnadiene-17α,21-diol-3,11,20-trione-21-acetate, said starting material dimethylformamide, lithium chloride and bromine are heated together. Water is added to the reaction to cool to room temperature whereupon 1,4-pregnadiene-17α,21-diol-3,11,20-trione-21-acetate separates from solution and is recovered. The same reaction can be carried out at room temperature, however, additional time is required to convert the 1-pregnene-17α,21-diol-3,11,20-trione-21-acetate to 1,4-pregnadiene-17α,21-diol-3,11,20-trione-21-acetate.

The process can be carried out in a stepwise procedure by dissolving 1-pregnene-17α,21-diol-3,11,20-trione-21-acetate in acetic acid and treating the reaction mixture with one molar equivalent of bromine. Water is added to the reaction mixture, whereupon 1,2-dibromopregnane-17α,21-diol-3,11,20-trione-21-acetate separates from solution. This precipitate is recovered and reacted with dimethylformamide in the presence of lithium chloride to form 2-bromo-1-pregnene-17α,21-diol-3,11,20-trione-21-acetate. This compound when reacted with additional dimethylformamide in the presence of lithium chloride results in the formation of 1,4-pregnadiene-17α,21-diol-3,11,20-trione-21-acetate. Upon hydrolysis 1,4-pregnadiene-17α,21-diol-3,11,20-trione is formed.

The following examples are given for the purpose of illustration:

Example 1

The direct conversion of 1-pregnene-17α,21-diol-3,11, 20-trione-21-acetate to 1,4-pregnadiene-17α,21-diol-3,11, 20-trione-21-acetate can be indicated graphically as follows:

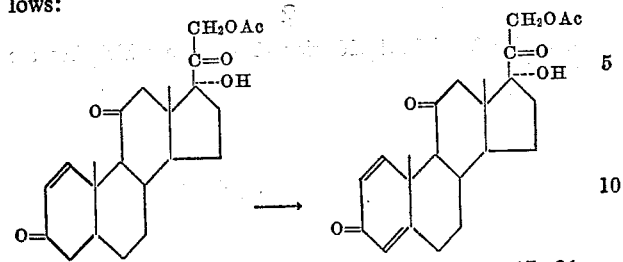

To 1.0 gram (2.5 millimoles) of 1-pregnene-17α,21-diol-3,11,20-trione-21-acetate dissolved in 10 ml. of dimethylformamide was added 1.0 gram of lithium chloride and 0.5 gram (2.5 millimoles) of bromine. The reaction mixture was heated on a steam bath for two hours. The hot solution was diluted with 10 ml. of water and the mixture was allowed to stand until it came to room temperature. The crystals which had separated from solution were removed by filtration, washed, and dried. The crude 1,4-pregnadiene-17α,21-diol-3,11,20-trione-21-acetate thus obtained had λ maximum 2350 A., E% 279, in methanol λ maximum 2660 A., E% 276 in sulfuric acid.

*Example 2*

To 1.0 gram (2.5 millimoles) of 1-pregnene-17α,21-diol-3,11,20-trione-21-acetate dissolved in 10 ml. of dimethylformamide was added 1.0 gram of lithium chloride and 0.5 gram (2.5 millimoles) of bromine. The mixture was allowed to stand for five days, during which time crystals of 1,4-pregnadiene-17α,21-diol-3,11,20-trione-21-acetate separated from solution. These crystals were recovered by filtration and washed and dried. This had a λ maximum 2370 E% 266 in methanol.

*Example 3*

The preparation of 1,4-pregnadiene-17α,21-diol-3,11,20-trione can be indicated graphically as follows:

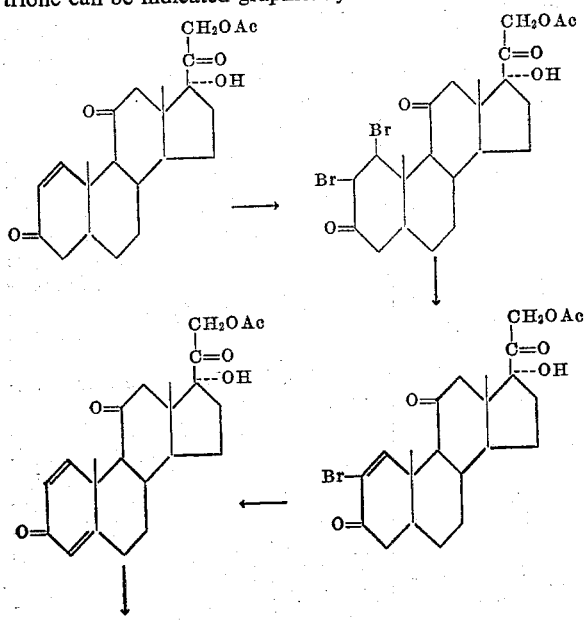

One gram (2.5 millimoles) of 1-pregnene-17α,21diol-3,11,20-trione-21-acetate was dissolved in 50 ml. of acetic acid and 0.4 gram (2.5 millimoles) of bromine in 2.7 ml. of acetic acid was added at room temperature. The bromine color was discolorized within five minutes. The addition of 50 ml. of water caused solid to precipitate. Another 50 ml. of water was added and the resulting slurry aged for one hour in an ice bath. The colorless product was filtered, washed with water, and dried under vacuum. The solid product, 1,2-dibromopregnane-17α,21-diol-3,11,20-trione-21-acetate, thus obtained had a bromine content of 28.6%. There was no ultraviolet absorption maximum in methanol solution.

A solution of 0.54 gram (0.96 millimole) of 1,2-dibromopregnane-17α,21-diol-3,11,20-trione-21-acetate and 0.5 gram of lithium chloride in 5 ml. of dimethylformamide was heated on the steam bath for two hours. The hot solution was diluted with an equal volume of water and allowed to cool to room temperature whereupon a solid separated from solution. The solid was filtered off, washed with water, and vacuum dried to yield crude 2-bromo - 1 - pregnene - 17α,21 - diol - 3,11,20 - trione - 21-acetate having λ maximum 2480, E% 217 in methanol.

The 2-bromo-1-pregnene-17α,21-diol-3,11,20-trione-21-acetate can be added to a mixture of lithium chloride in dimethylformamide and the reaction mixture heated to form 1,4-pregnadiene-17α,21-diol-3,11,20-trione-21-acetate. This latter compound can be readily converted to 1,4-pregnadiene-17α,21-diol-3,11,20-trione by hydrolysis of the 1,4-pregnadiene-17α,21-diol-3,11,20-trione-21-acetate in an oxygen-free atmosphere with sodium methoxide in methanol for a period of about seven minutes at room temperature.

Any departure from the above description which conforms to the present invention is intended to be included within the scope of the claim.

What is claimed is:

The process which comprises reacting 1-pregnene-17α, 21-diol-3,11,20-trione-21-acetate with bromine and dimethylformamide in the presence of lithium chloride to form 1,4-pregnadiene-17α,21-diol-3,11,20-trione-21-acetate.

References Cited in the file of this patent

UNITED STATES PATENTS

| | | |
|---|---|---|
| 2,774,775 | Korman et al. | Dec. 18, 1956 |
| 2,783,226 | Gould et al. | Feb. 26, 1957 |